UNITED STATES PATENT OFFICE.

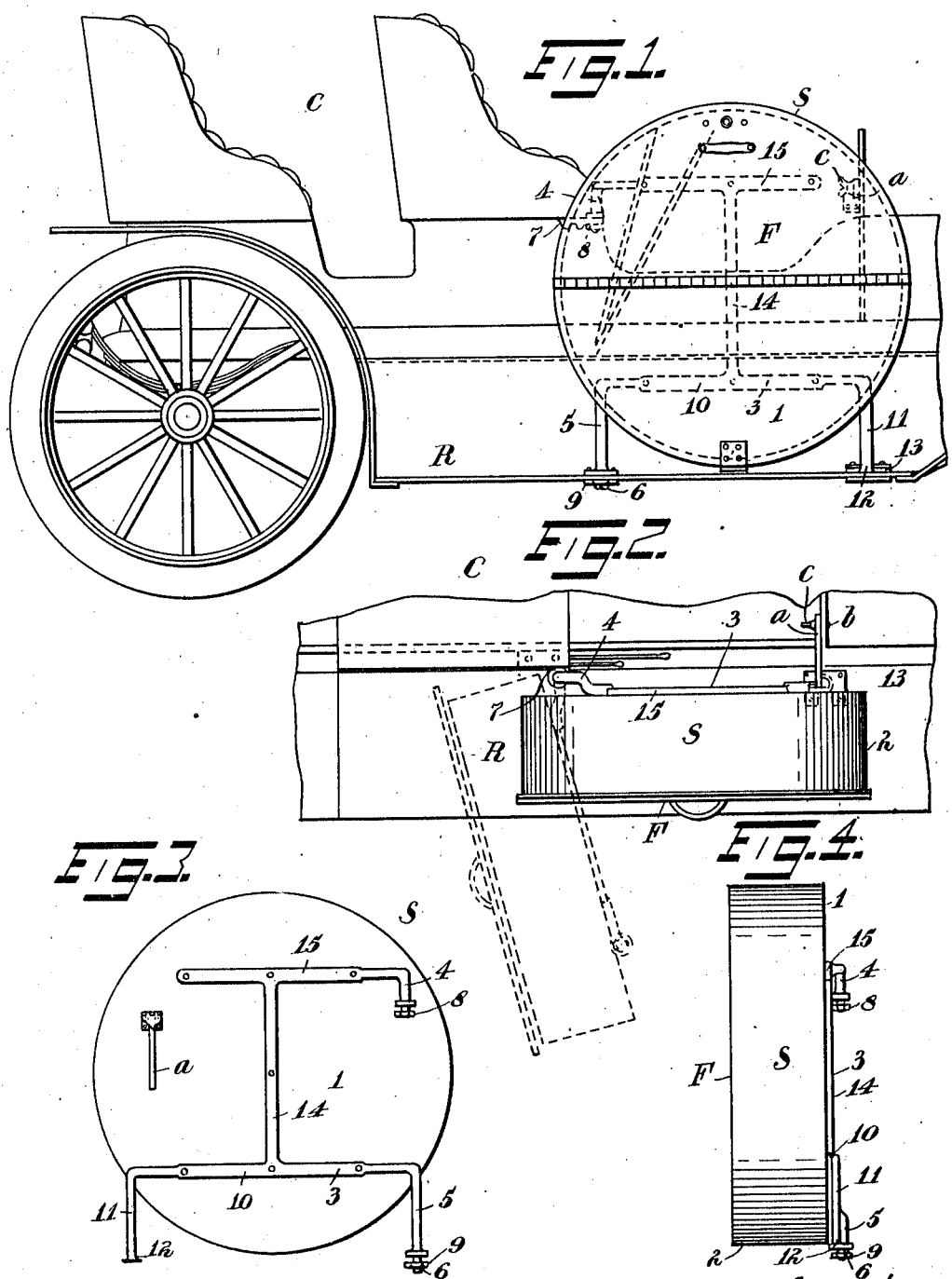

BERNARD A. ALPERIN, OF NEW YORK, N. Y., ASSIGNOR TO LAFAYETTE B. GLEASON, OF DELHI, NEW YORK.

TIRE-CASE.

993,632.  Specification of Letters Patent.  Patented May 30, 1911.

Original application filed May 5, 1909, Serial No. 493,998. Divided and this application filed June 21, 1909, Serial No. 503,291. Renewed December 13, 1910. Serial No. 597,150.

*To all whom it may concern:*

Be it known that I, BERNARD A. ALPERIN, a citizen of the United States, residing in New York city, in the county of New York and State of New York, have invented certain new and useful Improvements in Tire-Cases, of which the following is a specification.

This application is a division of an application filed by me May 5, 1909, Serial No. 493,998, for auto tire containers; which application was patented August 9, 1910, Patent No. 966,414.

This invention relates to a receptacle or case for motor cars, for the tires and their accessories and has for its object to provide a casing that will efficiently protect the tubes and the casings which will have means for efficiently securing it to the car, whereby it can have its position conveniently changed when desired.

In the accompanying drawings representing one embodiment of my invention Figure 1 shows in side elevation the rear portion of a car with the casing in place on the running board. Fig. 2 is a plan view of the part shown in Fig. 1. Fig. 3 is a rear view of the case, and Fig. 4 is an end view of the case.

The car denoted generally by C, has the usual running board R, on which the tire case, denoted generally by S, is located. The case is shown somewhat drum shaped, comprising a rear disk member 1 to which is secured the cylindrical side member 2. Both of these members are of preferably rigid material, preferably of sheet metal, that is of as light weight as consistent with strength, and may be made of aluminum. The case also comprises a front member denoted generally by F, that may be hinged thereto to open and close for the insertion and removal of the tires or other articles.

The case is provided with a supporting member, whereby it can swing on the running board outwardly from its normal position parallel with the road. It is shown as having a frame work denoted generally by 3 provided with hinge portions 4 and 5. The hinge portion 5 has a bolt 6 passing through the foot board and forming one pivot member. The hinge 4 which is in vertical alinement with hinge 5 turns in a bracket 7, secured to any convenient portion of the car body. These hinge portions being at the rear of the case near one side, permit it to swing outward from the body as indicated in Fig. 2. This will facilitate getting in and out of the car, and will give access to the levers and other controlling members at such portion of the car. By removing the nuts 8 and 9 of these pivot hinge portions, the casing can be removed from the car.

The hinge frame work 3 is shown as comprising a horizontal bar 10 of which the hinge part 5 is an extension, and another extension 11 at the opposite side rests on the running board when the case is in its normal position and assists in supporting the case. If desired this extension may have a head 12 fitting into a slotted plate 13 on the running board, to retain the supporting portion securely in position.

A strip $a$ is hinged to the rear of the case on a bracket $d$ and engages a bolt $b$ on the dash board and may be secured by a wing nut $c$ to hold the case in normal position. The hinge frame has a vertical portion 14 connecting with a transverse bar 15, of which the hinge portion 4 is an extension. These two transverse portions connected by the vertical portion form a convenient means for securing to the rear portion 1 of the casing and also serve to brace and strengthen the device.

Having thus described my invention, I claim:

1. The combination with a car body and a running board, of a drum shaped case having one circular side hinged, a frame member secured on the back of the case and having hinge members to one side in alinement, one of the hinge members being pivoted on the running board and the other hinge member being pivoted to the side of the car whereby the case can swing outwardly from the car, and a foot rest on the frame on the opposite side from the hinge members for engagement with the running board.

2. The combination of a drum-shaped case having one side hinged, a frame member secured on the back of the case and having hinge members at one side in vertical alinement, and a foot rest on the frame member on the opposite side from the hinge members.

3. The combination with a car body of a drum-shaped case having one circular side hinged, a frame member secured on the back of the case and having hinge members at one side in alinement, said hinge members being pivoted on the car whereby the case can swing outwardly from the car, and a foot rest on the frame member on the opposite side from the hinge members, for supporting the case.

4. The combination with a car body and a running board, of a drum-shaped case having one side hinged, a frame member secured on the back of the case and having hinge members at one side in alinement, one of the hinge members being pivoted on the running board and the other hinge member being pivoted to the side of the car whereby the case can swing outwardly from the car, a socket on the running board, a foot rest on the frame member on the opposite side from the hinge members adapted for engagement with said socket.

BERNARD A. ALPERIN.

Witnesses:
WILLIAM H. REID,
FRED. J. DOLE.